Oct. 12, 1965 J. M. BENTLEY 3,211,919

RETENTIVE MEMORY CIRCUIT FOR LOSS OF POWER SUPPLY

Filed Aug. 3, 1961

WITNESSES:
Leon M. Garman
James F. Young

INVENTOR
John M. Bentley
BY Ernest P. Klipfel
ATTORNEY 3,211,919

RETENTIVE MEMORY CIRCUIT FOR LOSS OF POWER SUPPLY

John M. Bentley, Glen Burnie, Md., assignor to Westinghouse Electric Corporation, East Pittsburgh, Pa., a corporation of Pennsylvania Filed Aug. 3, 1961, Ser. No. 129,102
3 Claims. (Cl. 307—88.5)

The present invention relates generally to retentive MEMORY circuits and more particularly relates to a non-volatile semiconductor bistable storage and logic element.

Upon removal or loss and reconnection of the power supply to a MEMORY or FLIP-FLOP logic circuit of the prior art, the output state of the circuit prior to loss of power may be lost. Conventional FLIP-FLOP circuits provide no assurance that the circuit will be restored to the condition held at the time power was disconnected. It is readily apparent that loss of the prior history of the FLIP-FLOP circuit upon reconnection of the circuit can result in improper operation of the logic network or controlled apparatus.

An object of the present invention is to provide a retentive MEMORY circuit enabling the use of a semiconductor device in a fast non-volatile, non-destructive readout MEMORY logic element for computers and data processing equipment networks.

Another object of the present invention is to provide a circuit allowing the construction of memories and arithmetic and control units that retain all information stored therein even though main power was completely cut off.

Another object of the present invention is to provide a bistable circuit capable of remembering its output state and allowing operation of the network to proceed, after power is restored, thereby retaining valuable information which in circuits of the prior art could have been lost.

Further objects and advantages of the present invention will be readily apparent from the following detailed description taken in conjunction with the drawing, in which.

Figures 1, 2, 3:
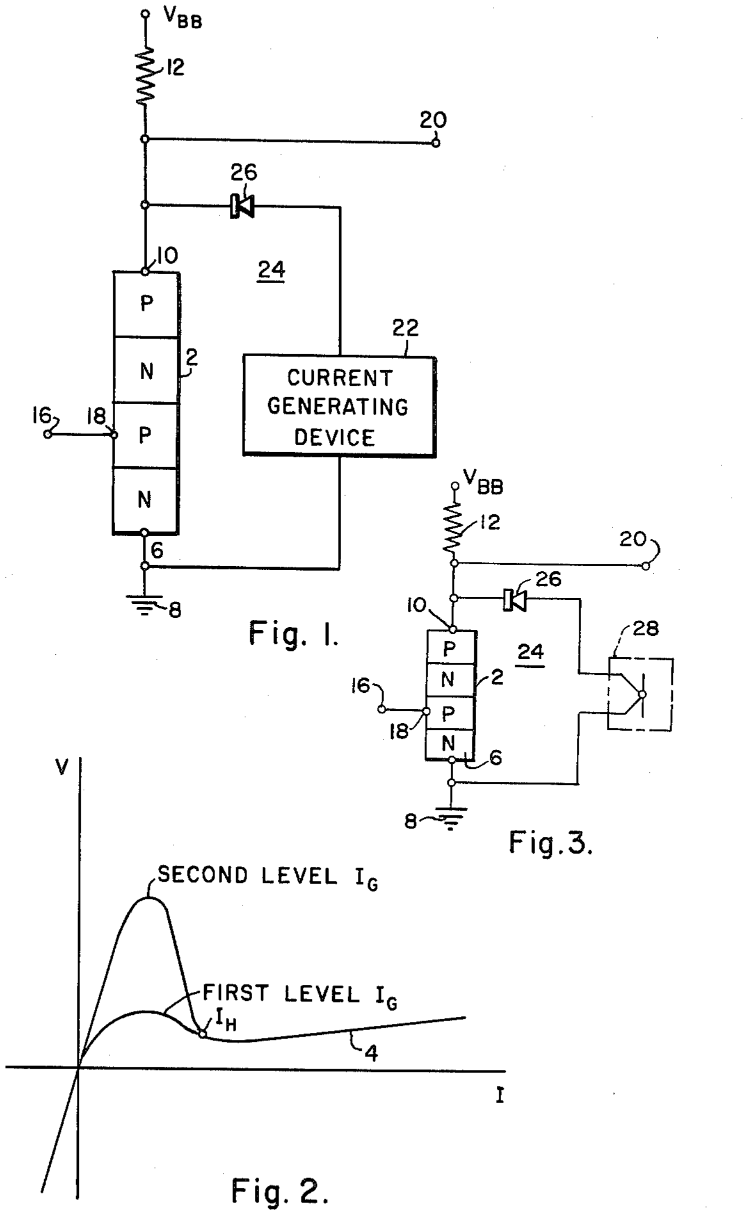
FIGURE 1 is a schematic diagram of an illustrative embodiment of the present invention.
FIGURE 2 is a characteristic curve of a device utilized in the illustrative embodiment of FIGURE 1.
FIGURE 3 is a schematic diagram of a more specific illustrative embodiment of the present invention.

A semiconductor device 2 utilized in the present invention has the characteristic of blocking current in one direction thereby simulating a switch in the open position. In other words, if a potential is applied to the device in that direction, referred to as the forward direction, a negligible current will flow even at a substantial voltage thereacross so long as a threshold or breakover potential level is not exceeded. However, by applying a small controlled current $I_G$ to such device, the threshold breakover potential level can be greatly reduced so that the device is rendered conductive and simulates a switch in the closed position.

One such suitable device is a three-terminal semiconductor switching device, either P-N-P-N or N-P-N-P, comprising (1) a wafer of semiconductive material having a first and second region of a first type of semiconductivity (such being either P or N) separated by a region of the second type of semiconductivity, (2) a P-N junction between each of the regions of first type of semiconductivity and the region of second type conductivity, (3) an emitter disposed upon one surface of one region of the first type of semiconductivity and (4) a P-N junction between the emitter and the region of first type semiconductivity. Electrical leads are connected to each of the regions thereof of first type semiconductivity, anode and gate, and to the emitter or cathode. The device is used in a switching mode in which the switching is controlled by approximately applying control current to the device. The characteristics of such a breakover device are illustrated by the curve 4 in FIGURE 2.

Once the device 2 has broken over, it will continue to allow conduction even though the gating signal has been removed as long as the current flow from anode to cathode exceeds a minimum holding current level $I_H$. Of course, any semiconductor device exhibiting a similar characteristic curve may be used.

Such a semiconductive breakover device 2 is connected with its cathode 6 to a point of reference potential or ground 8 and its anode 10 through a biasing resistor 12 to a bias power supply $V_{BB}$. Input means 16 is connected to the gate electrode 18 for controlling the conductive state of said device 2 by providing a gating current, $I_G$, for rendering said device conductive, hereinafter referred to as the first level signal, and a second level signal of reference or ground potential capable of restoring the breakover threshold level to its maximum, thereby rendering said device to its non-conductive state.

Output means 20 is connected between the junction of said anode 10 and biasing resistor 12. The output means, illustrated as an output terminal 20, will provide a first potential level substantially equal to the magnitude of the power supply $V_{BB}$ when said device 2 is non-conductive and provide a second signal of substantially ground potential when the said device is rendered conductive by reason of a first level signal at said input means 16. In such a manner, a logic circuit is provided for interconnection of similar logic circuits in a network.

As stated previously, once the device 2 is turned "on," the anode current can be reduced to a small value equal to the minimum sustaining value while the anode voltage also remains low. Should the device be in its conductive state upon loss of the power supply $V_{BB}$, the device would return to its non-conductive state since a minimum sustaining current would not be present through the device during a power outage. It would then be necessary to once again pulse the device through its conductive state, but of course, the information contained within the circuit would already have been lost.

However, in accordance with the present invention a constant current generating circuit 24 is connected across the semiconductor breakover switching device 2 so that the logic circuit will not change its output state even though the power supply voltage $V_{BB}$ was removed. If the semiconductor device was in its conductive state before the power supply $V_{BB}$ was removed, it will continue in its conductive state thereafter since the current generating circuit 24 is selected to provide a continuous current through the semiconductor device 2 of sufficient magnitude to maintain a current flow somewhat greater than the minimum sustaining or holding current $I_H$ necessary to keep the device 2 in its conductive state. If the semiconductor device 2 was in its non-conductive state upon removal of power supply $V_{BB}$ it would remain in that state upon reconnection of the supply $V_{BB}$ since the threshold breakover potential level of the device 2 is selected to be greater than the summation of the voltage thereacross from the supply $V_{BB}$ and the current generating circuit 24 in the absence of a gating current or first level signal to the device 2.

The current generating circuit 24 comprises in series circuit combination a current generating device 22, such as a battery, a thermocouple, ionic battery or other suitable device, and a rectifier 26 poled to protect the current generating device 22 from the power supply voltage $V_{BB}$, but to allow current from said current generating device 22 through the semiconductive switching breakover device 2. The current generating device 22 is selected to provide a continuous current through the semiconductor device 2 of a magnitude greater than the minimum sustaining current $I_H$ but considerably less voltage than the breakover potential level.

Accordingly, it can be seen that the output state of the logic circuit is retained even though the power supply is lost and reconnected. When desired, a thermocouple 22 may be built into each logic unit and made independent of all others to provide a potential insufficient to cause breakover of the switching device 2 in and of itself but to provide sufficient current through the device 2 to exceed the minimum sustaining current $I_H$ should the device be conductive upon loss of power supply $V_{BB}$.

FIG. 3 illustrates a more specific embodiment of the present invention wherein similar items are identified with the like reference characters of FIG. 1. A thermocouple 28 capable of generating current in response to temperature variations provide the necessary minimum sustaining current for the device 2.

While the present invention has been described with a degree of particularity for the purposes of illustration, it is to be understood that all equivalents alterations, and modifications with in the spirit and scope of the present invention are herein meant to be included. For instance, the auxiliary power supply source 22 may take the form of a battery, a thermocouple, or any other current generating device. As improvements on four layer switching devices are made, the minimum holding current will be further decreased in magnitude thereby reducing the requirements on the holding voltage power supply source. Even at the present time, thermocouples have been developed using uranium carbide as a heat source with one element of the thermocouple being cesium gas. This thermocouple develops an open circuit voltage of approximately 3.8 volts and a short circuit current of 120 amperes.

I claim as my invention:

1. In combination; a semiconductor breakover device utilized in a switching mode; means for connecting to said device a power supply to be switched; input means for selectively receiving a first level signal for rendering said device conductive and a second level signal for rendering said device non-conductive; said device having a minimum current level necessary to sustain conduction through said device once said device is rendered conductive; output means for providing a first level signal when said device is non-conducting and a second level signal when said device is conductive; and means for continually maintaining a current through said device of a magnitude sufficient to keep said device in its conductive state when said device is in its conductive state upon failure of said power supply but insufficient to change the conductive state of said device when said device is in its non-conductive state upon failure of said power supply.

2. The apparatus of claim 1, wherein said means for maintaining comprises a series circuit combination of a thermocouple and a rectifier connected across said semiconductor switching device and poled to allow current therethrough only in the required direction to sustain the conductive state of said device.

3. A bistable retentive memory circuit having a first and a second output state; said circuit comprising, a semiconductor switching device having an adjustable breakover potential level; means for connecting to said device a power supply to be switched; said switching device being in a non-conductive state when the potential thereacross is insufficient to exceed said breakover potential level and being in its conductive state when the voltage thereacross exceeds said breakover potential level; input means for adjusting the potential breakover level of said device; said device having a minimum holding current level necessary to sustain conduction through said device once said device is rendered conductive; output means responsive to the conductive state of said device; and means operably connected across said device for continually providing, upon loss of said power supply, a current through said device of a magnitude greater than said sustaining current level but insufficient to cause said device to break over.

References Cited by the Examiner

UNITED STATES PATENTS

| | | | |
|---|---|---|---|
| 2,534,542 | 12/50 | Bower | 307—64 |
| 2,982,870 | 5/61 | Hilbiber | 307—88.5 |
| 3,021,436 | 2/62 | Jones et al. | 307—88.5 |
| 3,034,106 | 5/62 | Grinich | 307—88.5 |
| 3,131,311 | 4/64 | Ross | 307—88.5 |

OTHER REFERENCES

Publication "Notes on the Application of the Silicon Controlled Rectifier," by G. E. Co., dated December 1958, pages 1–8 particularly pertinent.

ARTHUR GAUSS, *Primary Examiner.*

JOHN W. HUCKERT, *Examiner.*